(12) United States Patent
Haymes et al.

(10) Patent No.: US 6,751,443 B2
(45) Date of Patent: Jun. 15, 2004

(54) ERROR CORRELATION FOR WIRELESS NETWORKS

(75) Inventors: Charles Louis Haymes, Wesley Hills, NY (US); Dominick Anthony Zumbo, Carmel, NY (US)

(73) Assignee: International Business Machines Corporation, Armonk, NY (US)

( * ) Notice: Subject to any disclaimer, the term of this patent is extended or adjusted under 35 U.S.C. 154(b) by 377 days.

(21) Appl. No.: 09/840,616

(22) Filed: Apr. 23, 2001

(65) Prior Publication Data
US 2001/0016488 A1 Aug. 23, 2001

Related U.S. Application Data

(62) Division of application No. 09/133,649, filed on Aug. 13, 1998.

(51) Int. Cl.[7] .............................................. H04B 17/00
(52) U.S. Cl. .................... 455/67.11; 455/423; 455/446; 375/225; 375/240.27; 714/704; 714/708
(58) Field of Search ............................. 455/67.11, 11.1, 455/437, 522, 427, 12.1, 446, 56, 423, 418, 421, 422, 436, 432, 9; 714/708, 704; 375/240.27, 225

(56) References Cited

U.S. PATENT DOCUMENTS

| | | | | |
|---|---|---|---|---|
| 5,095,500 A | * | 3/1992 | Tayloe et al. | 379/32.01 |
| 5,095,531 A | * | 3/1992 | Ito | 455/435.3 |
| 5,517,674 A | * | 5/1996 | Rune | 455/437 |
| 5,754,959 A | * | 5/1998 | Ueno et al. | 455/453 |
| 5,787,346 A | * | 7/1998 | Iseyama | 455/439 |
| 5,878,397 A | * | 3/1999 | Stille et al. | 455/466 |
| 5,914,668 A | * | 6/1999 | Chavez et al. | 340/7.39 |
| 6,181,943 B1 | * | 1/2001 | Kuo et al. | 455/437 |

\* cited by examiner

Primary Examiner—Cong Van Tran
(74) Attorney, Agent, or Firm—L. Herzberg

(57) ABSTRACT

Alternate methods, devices and systems are presented for providing service providers and/or end users of mobile stations to monitor and/or report regions with high error rates and/or dead zones. A protocol is provided such as to yield the error occurrence, error rate and/or the address of the end user. In some embodiments it also contains location information and time of day information. This information may be collected from the G.P.S., and/or all or a portion of users when there is a significant transmission difficulty and/or an abundance of errors. The collected data forms a database which is analyzed to generate coverage maps. This may include the dynamic aspects of the mobile network. In another aspect of this invention, each mobile station periodically compares its current location with the data base. The results of this comparison enables the mobile unit to anticipate connection problems. In still another aspect of the invention, the comparison is performed by the service provider which notifies the end user.

17 Claims, 3 Drawing Sheets

US 6,751,443 B2

ERROR CORRELATION FOR WIRELESS NETWORKS

This is a division of application Ser. No. 09/133,649 filed on Aug. 13, 1998.

FIELD OF THE INVENTION

The present invention is directed to the field of wireless networking. It is more specifically directed to error correlation in wireless networks.

BACKGROUND OF THE INVENTION

It is generally known that mobile and non-mobile wireless network performance is generally very dependent upon the location of the end user. For example, in RF networks (e.g., . . . cellular telephones), moving out of a service provider's basic coverage area results in high error rates and/or dropped connections. It is important for a service provider to map the coverage area and find out areas where messages cannot penetrate called dead zones. These dead zones can change depending on time of day, changing interference generators, and even seasonally.

It is advantageous for a service provider to know the dead zones of a service. Because of the difficulty to determine small dead zones the service provider may not actually be knowledgeable of the dead zones of a particular service. This problem is compounded when the dead zones change dynamically due to known and of times unknown influences. Additionally, more often than not these dead zones are sensitive to the communication channel frequency. Presently a service provider is not always able to notify its users in a particular area of channel dead zone mappings and/or a user's approaching or being within a dead zone. Knowing that a dead zone is channel dependent would enable a service provider to indicate the best channels to be used in particular areas automatically or otherwise. It would thus be extremely useful for a service provider to continuous know the dead zones of a service and or service frequency both as it is statically and as it changes dynamically.

SUMMARY OF THE INVENTION

It is thus an aspect of this invention to establish a protocol and method for end users of mobile stations to report regions with high error rates and/or are dead zones. The protocol is such as to yield the error occurrence, error rate and/or the address of the end user. In some embodiments it also contains location information and time of day information. This information may be collected from all or a portion of users every time there is a significant transmission difficulty and/or an abundance of errors. The collected data forms a database which is analyzed to generate coverage maps. This may include the dynamic aspects of the mobile network.

In another aspect of this invention, each mobile station periodically compares its current location with the data base. The results of this comparison enables the mobile unit to anticipate connection problems. In still another aspect of the invention, the comparison is performed by the service provider which notifies the end user.

BRIEF DESCRIPTION OF THE DRAWINGS

These and other objects, features, and advantages of the present invention will become apparent upon further consideration of the following detailed description of the invention when read in conjunction with the drawing figures, in which.

DETAILED DESCRIPTION OF THE INVENTION

One embodiment of this invention establishes a protocol and method for mobile stations to report regions with high error rates and/or dead zones. It is advantageous that the protocol yield not only the error rate and address of the end user, but also yields location information and/or time of day information. This information is collected in a service provider database. The database is formed from all user notifications every time there are significant transmission errors. The collected data is analyzed to generate coverage maps which also include the dynamic aspects of the mobile network.

In a particular embodiment, mobile stations and/or the service provider periodically compare their current location with the maps. In this case the mobile unit and/or the service provider can anticipate connection problems at the particular user location. In some cases the service provider notifies the end user of a particular channel to use in the particular location for best communication.

Figure 1:
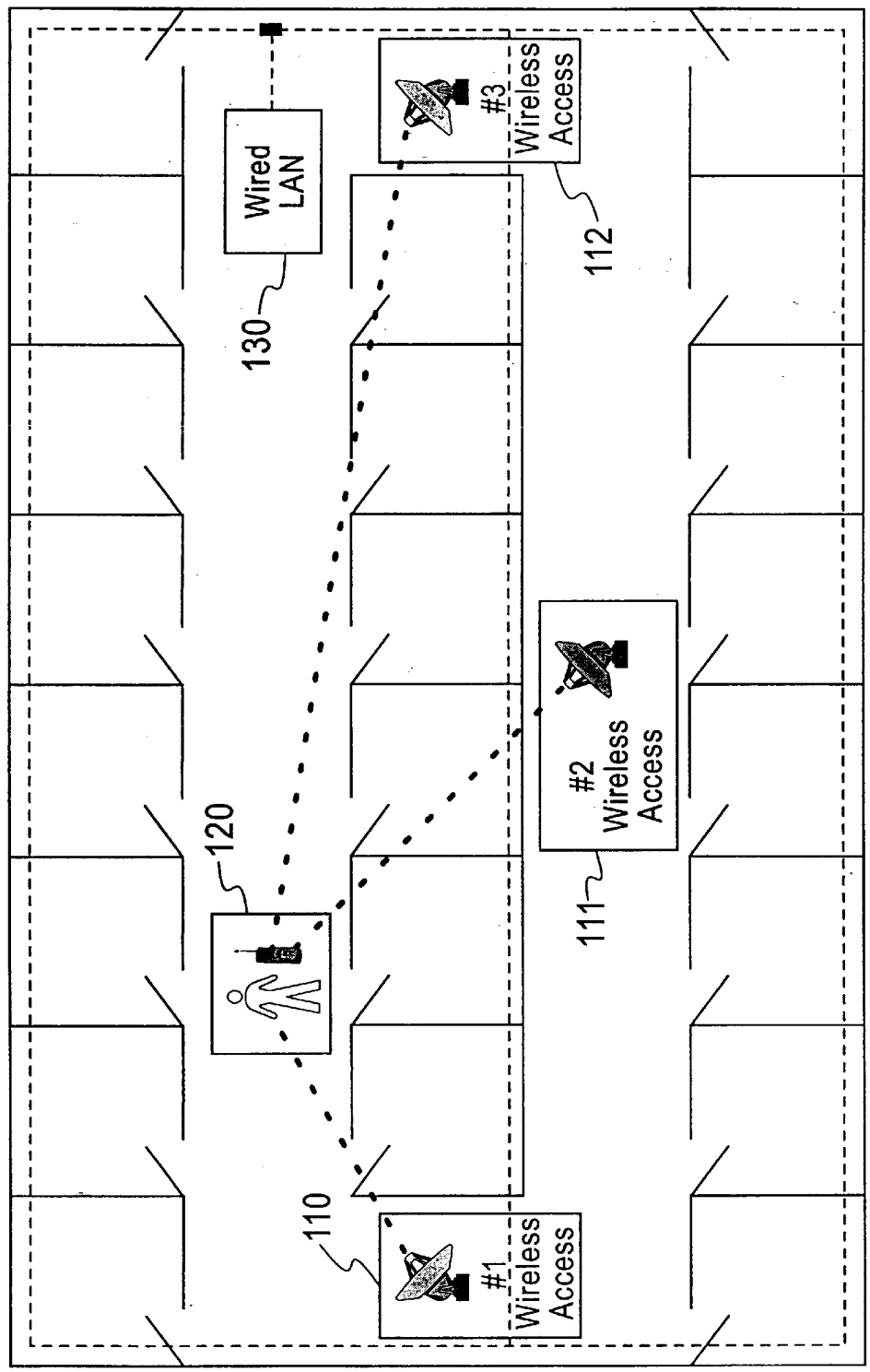
FIG. 1 shows an example of the invention in an office environment in which a mobile network is inside near a building also having a traditional wired local area network, wherein the system has three base stations having wireless access to a mobile user on a wireless network.

An example embodiment relates to an office environment in which a mobile network is inside and/or near a building also having a traditional wired local area network. FIG. 1 shows a system having three base stations 110–112 having wireless access to a mobile user 120 on a wireless LAN 130. These base stations 110–112 are generally fixed and connected into the wired building LAN 130 through which they communicate to each other over the wired LAN.

The base station also having ability to communicate with a plurality of users located within its coverage area range such as user 120.

In an embodiment, the mobile unit checks for errors on all incoming messages. This may be accomplished using CRC or another error detection mechanism. When the error rate for a mobile user rises above a pre-set threshold, the mobile unit transmits an error message. In some cases, the mobile unit uses an enhanced error reporting method to provide a higher probability of correct transmission of the error message. The error reporting method includes such things as transmitting at an above normal power level and/or using one or more alternate frequencies. When any of the base stations receive an error message, it alerts the other base stations of the error condition. In some cases, all the base stations automatically or manually search for the mobile user sending out the error message. In one embodiment, the user reporting the error enters an error reporting mode, and stays in that mode until it receives an error report acknowledge from a base station or until a timeout occurs the base stations employ a moveable directional antenna to traverse an arc and locate the direction of greatest signal strength from the user reporting the error. When three (or more) base stations have established the direction, a triangulation algorithm is used to calculate the exact location of that mobile user. The base station closest or the one receiving the highest signal strength level from that user to that user, transmits an acknowledgment to the mobile unit, and the reporting mobile unit exits the error reporting mode. In some cases there is a constantly updated data base that contains records of all error messages. This data base is processed to extract recurring error trends. This includes locations that are dead zones for one or more communicating channel frequencies in combination with particular time of day that are problematic. The availability of the data base allows mobile stations to periodically query the data base to determine if the user is entering into a known problem area or condition. The mobile station can then inform the end user of the appropriate steps to take to maintain connectivity such as change antenna direction, channel, etc.

Figure 2:
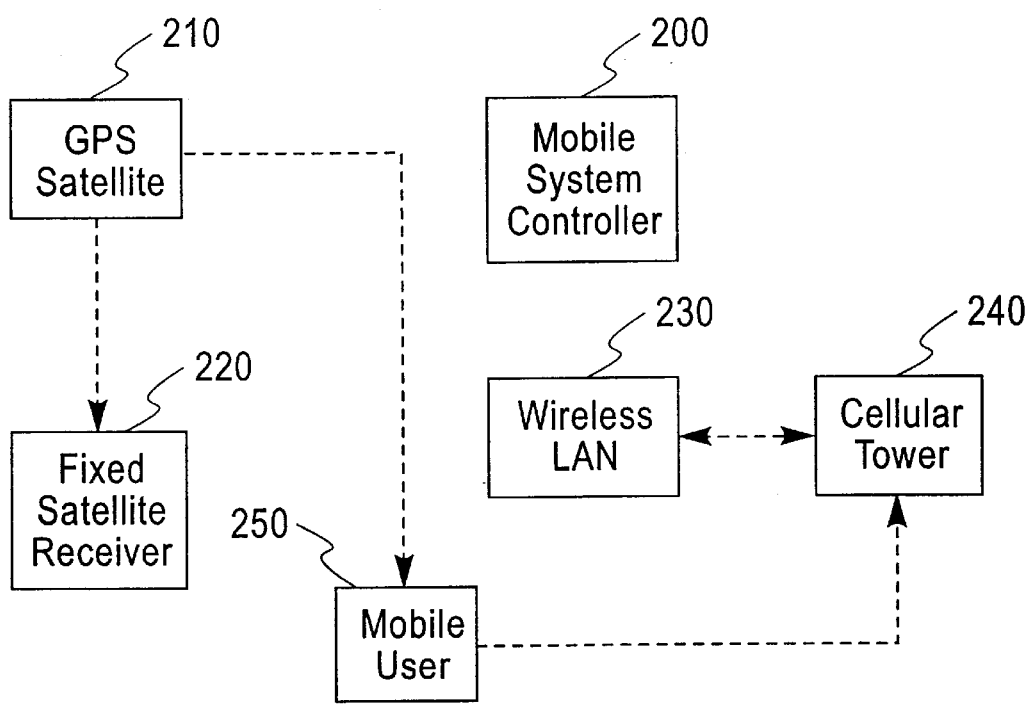
FIG. 2 shows an embodiment of the present invention for a field environment with a mobile network including a mobile unit controller which has a cellular radio tower which supports a plurality of mobile users on a wireless LAN.

Another example embodiment of the present invention relates to a field (outdoor) environment with a mobile network. FIG. 2 shows a mobile unit controller 200 which has a cellular radio tower 240 which supports a plurality of mobile users on a wireless LAN 230. A typical wireless user 250 is equipped with the ability to determine its location using the existing global positioning system (GPS) 210 technology. The process in this embodiment is similar to the previous embodiments, except in that the mobile system controller 200 knows the user's 250 position and includes that information in an error message. In this case, since there is wireless connectivity to the GPS satellite 210 there is no need for triangulation in this embodiment. Thus, this embodiment lends itself to mobile devices that already have GPS equipment installed. The devices may be in cars, trucks, buses, boats etc.

Figure 3:
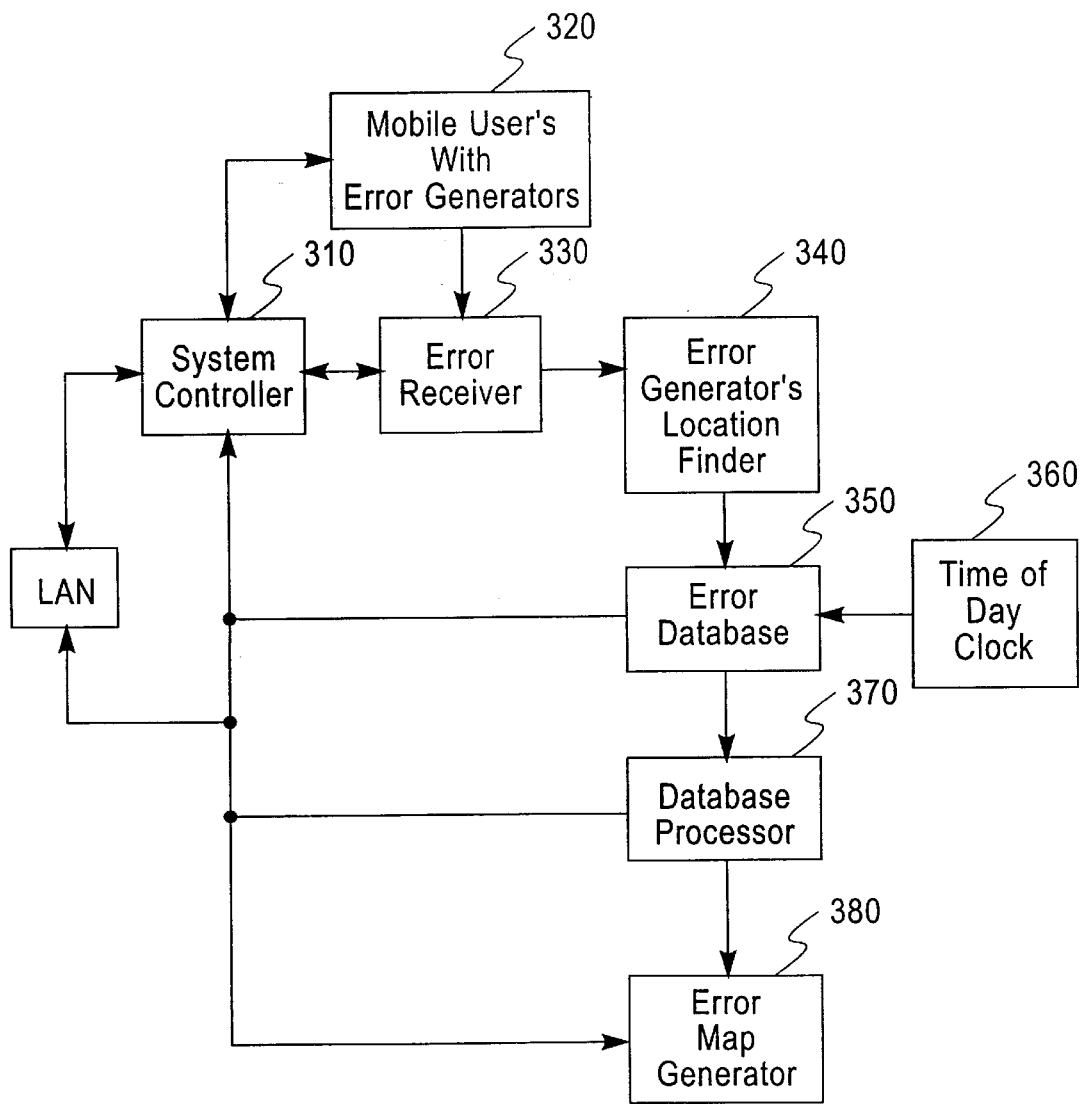
FIG. 3 shows an example of a system implementing this invention in an office environment connected via a wired LAN, including a system controller connected to a plurality of mobile users error generators 320, and to an error receiver.

There are many ways to implement a system implementing this invention in the office environment connected via a wired LAN. Such an embodiment is shown in FIG. 3. FIG. 3 shows a system controller 310 connected to a plurality of mobile users error generators 320, and to an error receiver 330. The error receiver 330 feeds received errors to an error generator's location finder 340. The location finder 340 feeds an error database 350. The error database 350 is connected to a time of day clock 360. The database 350 feeds, the error data, location and time of day to a database processor 370. The processor 370 correlates groups of errors and feeds the correlated data to an error map generator 380 which generates maps of dead zones for the mobile service.

In some embodiments, the error data includes the channel frequency and/or the time of day and/or the location of the mobile user 320 that generates the error signal. The system controller 310 relays the error map to all the users 320 near or at a dead zone. In this case, the mobile users 320 continually check for errors on all incoming messages. This may be accomplished via CRC or another error detection mechanism. When the error rate of a user 320 rises above the preset threshold, the user transmits an error message. The error message can contain a unique user identifier such as MAC address, TCP/IP address etc., dependent upon the system and the protocol being employed by the mobile system provider.

In an example embodiment, the mobile user's 320 unit uses one of the available methods of assuring a high probability of correct transmission of the error message to the error receiver 330. This may include using higher transmit power and/or using an alternate channel frequency. When the system controller 310 receives the mobile error message generated by the mobile user's unit 320 the other stations and/or mobile users are alerted that there is an error condition. The location finder 340 searches for the location of the mobile user sending out the error message.

In an example embodiment of the location finder, this is done by all the base stations using respectively controlled moveable directional antennae to traverse an arc and locate the direction of greatest signal strength. When three (or more) base stations have established the direction, a triangulation algorithm is used to calculate the exact location of the mobile user. In some case the base station closest to the user transmits an acknowledgment to the mobile unit, and the mobile user's unit 320 exits "error reporting mode". Alternatively, the mobile unit can repeat the error message for a fixed amount of time or repeat the message a fixed number of times and exit "error reporting mode" independent of base station interaction. This prevents a lock out situation in areas of very poor reception. In still another embodiment the GPS is used even in an office environment to satisfy the location finder's requirement.

There is a constantly updated error data base 350, that contains records of all error messages. This data base 350 may form or be contained within a network management station within one or more of the base stations. Alternatively the database 350 may be replicated at all of the mobile units. This data base 350 can be manipulated to extract any recurring error trends which indicate regions that are "dead zones" and/or combinations of locations and times that are problematic etc. When the data base 350 is established, it is advantageous for the system controller 310 to periodically query the database processor 370 to determine if a particular user 320 is entering into a known problem area or condition. The system controller may inform the end user of the appropriate steps to take to maintain connectivity. This is done via an audible alarm and/or a display at the user's 320 device. In some cases the user is told to change direction, channel, power level etc.

In the outdoor environment with a mobile network shown in FIG. 2, there are cellular radio towers supporting the mobile users 320 on a LAN 390. In this case LAN 390 is a wireless LAN. In addition, the mobile user's units 320 are equipped with the ability to determine their location using existing global positioning system (GPS) technology for the location finder 340. The process in this embodiment is similar to the office embodiment, except that the mobile user's unit 320 knows the user's position and includes that information in the error message. There is no need for triangulation in this embodiment. This embodiment lends itself to mobile devices that already have GPS equipment installed in cars, trucks, buses, boats etc. In an alternative embodiment of the outdoor environment also makes use of triangulation methods for the location finder 340.

In an alternate embodiment the mobile users enter a proposed trip route into a system containing both GPS location equipment and the present system as FIG. 3 to develop and generate dead zone mapping 380, to request routing and mobile service operational data. The system controller 310 responds and informs the user of a best route and/or channel/s and for continual mobile service and/or of areas along the route where communication coverage is questionable. In some cases the system controller 310 proposes and displays alternative routes which maintains different levels of mobile system connectivity automatically or in response to a user's request.

The concepts of the present invention may be implemented in many ways and in different packages. These include as in a method, system and/or a computer device to perform part or all of the steps of the method and/or system functions. Thus in one embodiment the invention is a method to detect dead zones in a wireless network. The network having a plurality of users being interconnected within the wireless network. The method includes a first user communicating via the wireless network. The first user measuring and detecting a message error rate while communicating. The first user broadcasting an error message to a base station when the error rate exceeds a predetermined error threshold level.

The base station obtaining a location of the first user and incorporating the location in a database of dead zones for the wireless network. In general each of a subset of the users has a mobile unit forming a mobile user connection with the wireless network. In an example configuration the wireless network includes a plurality of cellular phones and/or a plurality of portable computing devices interconnected via a wireless local area network. In some cases the method further includes a step of deploying a subset of the users within at least one building. An alternate invention embodiment is providing a method for error reporting in a mobile network having a plurality of members. The method includes the step of at least one of the members keeping track of the number of errored packets in a packet window. When the number of errored packets exceeds a predetermined threshold value, the one member enters an error transmit reporting mode and reports an error condition to a base station. The base station obtains the location of the member or the member provides its location to the base station.

In some cases the step of error detecting includes cyclic error detection, checksum calculation; and/or parity checking or another error detecting scheme. In some cases the error threshold level ratio is set at a predetermined value. The value is usually between 1 in a 1000 and 1 in a billion. A high value is such as to guarantee clear reception of the transmitted data.

Generally, the error message is broadcast with a signal having a high probability of reception by the base station in a dead zone. This may be at a higher power level, a lower transmission rate and/or a different frequency. In some case the step of broadcasting the error message is performed using 2–10 times the power level of normal message transmission and/or the step of broadcasting the error message is via a particular transmission channel with a greater probability of reception in the location, and/or the step of broadcasting the error message is at a data rate that up to ten times slower than the normal data rate. In some cases the time when the error occurred is included in an error message from the member detecting the error and is sent to the base station. Sometimes a unique identity of the member unit where the error was detected is included in an error message from the member to the base station. In some cases, the step of obtaining location information includes rotating a direction of at least one antenna of a group of antennae to determine the member location information by triangulation, and/or the step of obtaining location information includes employing a wired LAN connecting multiple base stations.

In particular embodiments, the method includes having the base station issue an acknowledge to the first user, and the first user ending an error transmit mode. In some cases, the step of broadcasting the error message is repeated a fixed number of times, and said first user ending an error transmit mode, or the step of broadcasting the error message is repeated over a fixed time interval whereupon the first user ends the error transmit mode and/or the step of logging the error message and location of the dead zone for transmittal to the base station at a later time whereupon the first user ends the error transmit mode and/or data extracted from the error messages are stored in a database for future manipulation and retrieval, and/or the database is resident at a network management station, and/or the database is replicated and resident at all network base stations, and/or the database is replicated and resident at all mobile network devices; and/or the step of forming a database of error reports, and extracting a set of features from the database, and/or the step of extracting includes determining the actual level of service obtained for said mobile network; and/or the database forms a map of dead zones in the building and/or includes the step of examining the database to determine an occurrence of a repetitive time dependent feature.

In another aspect of the invention a method is provided to detect dead zones in a wireless network employed in an outdoor environment. The network has a group of users interconnected within the wireless network. The method includes a first user communicating via the wireless network. The first user measures and detects a message error rate while communicating. The first user broadcasts an error message to one of its base stations when the error rate exceeds a preset error threshold level. The base station obtains the location of the first user from the first user or determines the location with its own means, and it incorporates the location in a database of dead zones for the wireless network. In some cases the step of obtaining includes employing a Global Positioning System (GPS) module or a Loran-C Positioning System module resident in the base station and/or the first user station, and/or each of a subset of the users has a mobile unit forming a mobile user connection with the wireless network. Sometimes the wireless network includes a plurality of cellular phones and/or the GPS module is built into the mobile unit interconnected with the wireless network.

In some cases, the wireless network includes a plurality of vehicles interconnected via a wireless wide area network and/or the method includes a step of deploying a subset of the users within at least one building.

In a particular embodiment of the method the mobile network has a plurality of members. The method further includes one or more of the following steps: at least one of the members keeps track of the number of errored packets in a packet window; the member device enters an error transmit reporting mode when the number of errored packets exceeds a predetermined or dynamic threshold; the member device reports an error condition to one of the base stations; and the base station obtains the location of the member. The dynamic threshold may be related to such things as network traffic rate and/or previously obtained dead zone data. The step of error detecting may include cyclic error detection, parity checking, and/or checksum calculation.

In many cases the error message is broadcast with a signal having a high probability of reception by the base station in a dead zone. In some cases the unique identity of the member detecting the error is included in the error message from the member to the base station and/or the step of obtaining location information includes querying the Global Positioning System to determine the members location.

In some embodiments, the method includes the step of the base station issuing at acknowledge to the first user, and the first user ending an error transmit mode upon receiving the acknowledge. In other cases the step of broadcasting the error message is repeated a fixed number of times, and/or the error message is repeated over a fixed time interval.

In a further embodiment, the method includes the step of logging the error message and the location of the dead zone for transmittal to the base station at a later time. In some of these embodiments data is extracted from the error messages and are stored in a database for future manipulation and retrieval. In some cases the database is resident at a network management station and/or the database is replicated and resident at all or a subset of network base stations and/or a subset of mobile network devices. Also, in some cases, a database of error reports is formed and a set of features is extracted from the database. The features may include determining the actual level of service obtained for the mobile network or to one or more network users. This determines whether the service is satisfactory or unsatisfactory at particular locations and/or to particular users. A feature also enables the database to form a map of dead zones in particular network service areas and/or to examine the database to determine an occurrence of a repetitive time dependent feature.

Still another aspect of the invention is to provide a method for notifying a family of users of the non-operating area of a wireless network. The method includes steps of obtaining a provided database of the non-operating area of the wireless network, a mobile unit user entering a desired trip route to a vehicle's GPS system, and the vehicle querying the database to download the map for dead zones in the trip route. In some cases the method further includes recommending a changed route having a reduced area of dead zones, and/or the changed route is shown by a GPS screen in the vehicle, and/or providing a warning signal to the user indicating that the vehicle is approaching a dead zone. Sometimes the warning signal includes an audible and/or a visual signal and/or any sensation perception.

In some cases, the user makes a data base query of network reception dead zones, and the network management station responds and determines if the user is entering a dead zone and/or the network management station informs the user of an appropriate step to take to maintain connectivity.

Still a further embodiment of the invention is to provide an error monitoring and collection system for a mobile network. The system includes a plurality of base stations and a plurality of mobile devices wirelessly interconnected with the base stations. Each device is a member of the mobile network. Each of a subset of the devices includes an error rate monitor to monitor a reception error rate, a message processor to enter into an error reporting mode when the reception error rate rises above a preset threshold. The processor is capable of forming and reporting an error message to a base station.

In some cases the error message is acknowledged by a base station often upon acknowledgment the mobile unit leaves an error reporting mode. Generally, the error message is used by a base station to determine which particular user reported the error and the location of the particular user when the error occurred.

Some system embodiments include a network manager which has a database that contains records of all error messages and/or the network manager includes a network processor to extract recurring error trends. In particular embodiment the network processor maps areas of network reception dead zones, and responds to a user request to query the data base to determine if the user is entering a dead zone. Sometimes, the network processor is able to inform the user of an appropriate step to take to maintain connectivity.

Another aspect of the invention is to provide a program storage device readable by machine, tangibly embodying a program of instructions executable by the machine to perform method steps for notifying a family of users of the non-operating area of a wireless network. The method steps include: providing a database of the non-operating area of the wireless network; a mobile unit user entering at trip route to a vehicle's GPS system; and the vehicle querying the database to download the map for dead zones in the trip route. In some embodiments the method includes recommending a changed route having a reduced area of dead zones and/or the changed route is shown on a GPS screen in the vehicle and/or providing a warning signal to the user indicating that the vehicle is approaching a dead zone.

It is noted that although the description is made for particular arrangements and applications, the intent and concept of the invention is suitable and applicable to other arrangements and applications. It will be clear to those skilled in the art that other modifications to the disclosed embodiments can be effected without departing from the spirit and scope of the invention.

What is claimed is:

1. An error monitoring and collection system for a mobile network, the system comprising:

a plurality of base stations;

a plurality of mobile devices wirelessly interconnected with the base stations, each device being a member of the mobile network, each of a subset of said devices including:

an error rate monitor to monitor a reception error rate;

a message processor to form and report an error message to one of the base stations when the reception error rate rises above a preset threshold;

in which said system includes location identifying means for locating the positions of devices sending error messages;

a network manager including a database that contains records of said error messages and a network processor that maps areas of network dead zones by storing said positions of devices sending error messages.

2. A system as recited in claim 1, wherein the error message is used by the one base station to determine an identity of the device reporting the error message and a location of the device at a time when the error occurred; and in which said network manager transmits a warning message to other devices located close to the device reporting the error.

3. A system as recited in claim 2, wherein the base station sends an acknowledgment to take the device out of an error reporting mode.

4. An error monitoring and collection system for a mobile network, the system comprising:

a plurality of base stations;

a plurality of mobile devices wirelessly interconnected with the base stations, each device being a member of the mobile network, each of a subset of said devices including:

an error rate monitor to monitor a reception error rate;

a message processor to form and report an error message to one of the base stations when the reception error rate rises above a preset threshold;

in which said system includes location identifying means for locating the positions of devices sending error messages;

a network manager including a database that contains records of all error messages and a network processor to extract records of recurring error trends;

wherein the network processor maps areas of network reception dead zones, and responds to a member request querying the data base to determine if the device is entering a dead zone.

5. A system as recited in claim 4, wherein the network processor is capable of informing the user of an appropriate action to maintain connectivity.

6. A system according to claim 4, in which said warning message transmitted by the base station to said others of said plurality of users near the location of the first user includes directions to change at least one of transmission channel, transmission power, or travel direction.

7. A system as recited in claim 6, wherein the error threshold level guarantees clear reception of data.

8. A system as recited in claim 7, wherein said step of broadcasting uses a signal having a high probability of reception by the base station in a dead zone.

9. A system as recited in claim 8, wherein the step of broadcasting the error message is performed at twice the power level used in normal message transmission.

10. A system as recited in claim 9, wherein the step of broadcasting employs a different transmission channel having a greater probability of reception than an original channel employed by the step of measuring.

11. A system as recited in claim 9, wherein the step of broadcasting is performed at a lower data rate than a first data rate employed by step of measuring.

12. A system according to claim 1, in which said warning message transmitted by the base station to said others of said plurality of users near the location of the first user includes directions to change at least one of transmission channel, transmission power, or travel direction.

13. A system as recited in claim 12, wherein the error threshold level guarantees clear reception of data.

14. A system as recited in claim 13, wherein said step of broadcasting uses a signal having a high probability of reception by the base station in a dead zone.

15. A system as recited in claim 14, wherein the step of broadcasting the error message is performed at twice the power level used in normal message transmission.

16. A system as recited in claim 14, wherein the step of broadcasting employs a different transmission channel having a greater probability of reception than an original channel employed by the step of measuring.

17. A system as recited in claim 14, wherein the step of broadcasting is performed at a lower data rate than a first data rate employed by step of measuring.

* * * * *